(12) United States Patent
Boyd et al.

(10) Patent No.: US 6,785,049 B1
(45) Date of Patent: Aug. 31, 2004

(54) ILLUMINATION SYSTEM FOR REFLECTIVE DISPLAYS

(75) Inventors: Gary T. Boyd, Woodbury, MN (US); Richard A. Miller, Stillwater, MN (US); Leland R. Whitney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/498,801

(22) Filed: Jan. 31, 2000

(51) Int. Cl.$^7$ .......................... G02B 5/30; G02B 27/14; F21V 9/14
(52) U.S. Cl. ...................... 359/485; 359/487; 359/490; 359/497; 359/500; 359/631; 359/633; 362/19; 362/555; 362/558; 362/560; 362/231; 362/800; 345/7
(58) Field of Search ................................. 359/485, 500, 359/490, 491, 501, 629, 857, 858, 487, 495, 497, 631, 633; 362/555, 558, 560, 227, 231, 800, 19; 345/7, 8; 353/119

(56) References Cited

U.S. PATENT DOCUMENTS

| | | | |
|---|---|---|---|
| 2,642,487 A | * | 6/1953 | Schroeder |
| 5,382,987 A | * | 1/1995 | Sperling |
| 5,394,253 A | | 2/1995 | Kelly |
| 5,402,269 A | * | 3/1995 | Oono et al. |
| 5,506,704 A | | 4/1996 | Broer et al. |
| 5,596,451 A | * | 1/1997 | Handschy et al. |
| 5,605,390 A | * | 2/1997 | Brice et al. |
| 5,612,820 A | | 3/1997 | Schrenk et al. |
| 5,676,442 A | * | 10/1997 | Fujimori |
| 5,800,032 A | * | 9/1998 | Uchiyama et al. |
| 5,808,800 A | | 9/1998 | Handschy et al. |
| 5,826,960 A | * | 10/1998 | Gotoh et al. |
| 5,853,240 A | * | 12/1998 | Tanaka et al. |
| 5,943,171 A | * | 8/1999 | Budd et al. |
| 6,072,635 A | * | 6/2000 | Hashizume et al. |
| 6,256,151 B1 | * | 7/2001 | Ma et al. |
| 6,282,029 B1 | * | 8/2001 | Ma et al. |
| 2002/0003508 A1 | * | 1/2002 | Schehrer et al. |

FOREIGN PATENT DOCUMENTS

| | | |
|---|---|---|
| EP | 0 492 636 | 7/1992 |
| EP | 0 982 705 | 3/2000 |
| WO | 94/11766 | 5/1994 |
| WO | 99/34246 | 7/1999 |

* cited by examiner

*Primary Examiner*—Ricky D. Shafer
(74) *Attorney, Agent, or Firm*—William D. Miller

(57) ABSTRACT

An illumination system for a reflective display is particularly useful for microdisplays that use reflective displays. The light source and the reflective image display unit are mounted in a coplanar manner, thus permitting the light source and the display unit to be mounted on a single board, or even on a single substrate. The display unit may include a first light source directing light generally along a first axis and a reflective image display unit disposed with an optical axis substantially parallel to the first axis. A reflective polarizing film is disposed to direct light from the first light source to the reflective image light display unit.

32 Claims, 15 Drawing Sheets

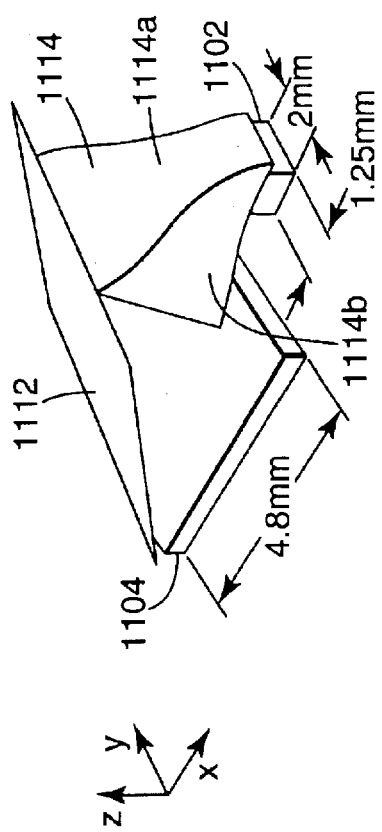
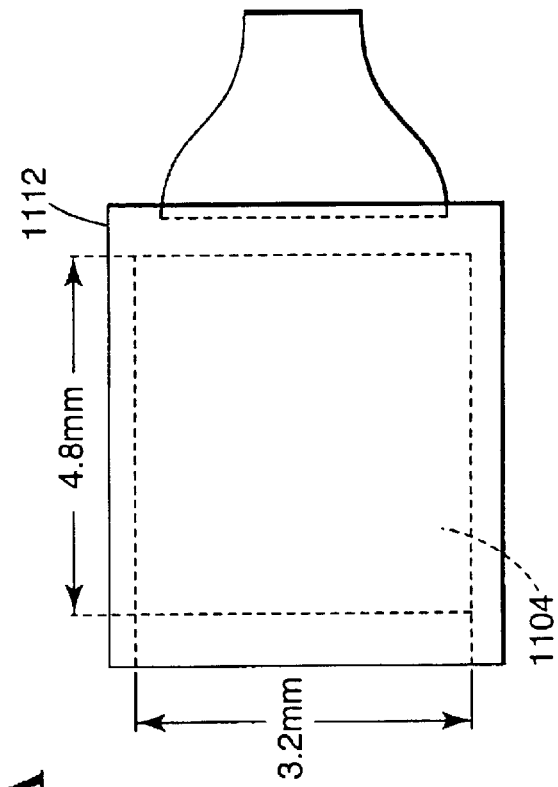
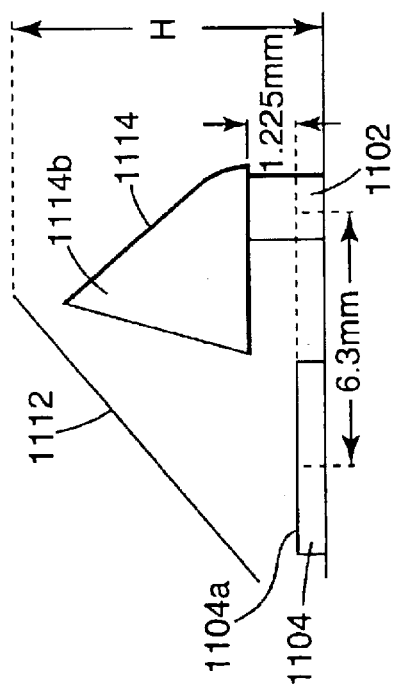
Fig. 11A
Fig. 11B
Fig. 11C

ILLUMINATION SYSTEM FOR REFLECTIVE DISPLAYS

FIELD OF THE INVENTION

The invention relates to reflective displays, and more particularly to a compact illumination system for a reflective display.

BACKGROUND

Many optical devices, such as microdisplays in electronic cameras and other types of display system, require illumination by a beam of light having relatively uniform brightness. Generally, light sources, such as incandescent lights, arc lamps, and light emitting diodes, provide a nonuniform light output that is unsuitable for direct use, so the light is typically homogenized in a diffusing cavity before illuminating a display unit. The display unit is often a reflective display unit, for example a reflective liquid crystal display panel, an array of tunable mirrors or "electronic paper". A polarization sensitive mirror is often used to direct light from the light source to the display unit.

The light source and display unit are typically mounted separately from each other on the display system housing, and are electrically connected via flex circuitry. This approach results in high component and fabrication costs, and a fault in the flex circuitry or in the connectors is often a primary failure mechanism for the display system.

Therefore, there is a need for a display system that is less expensive to fabricate and is more reliable than current display systems.

SUMMARY OF THE INVENTION

Generally, the present invention relates to an illumination system for a reflective display. The invention is believed to be particularly useful for microdisplays that use reflective displays. In the display system of the invention, the light source and display unit are mounted in a coplanar manner. This permits the light source and the display unit to be mounted on a single board, or even on a single substrate. Thus, the assembly costs may be reduced, and the reliability increased since the system is simpler, has fewer components, and omits the connectors and the flex circuit which tend to be unreliable.

One particular embodiment of the invention is an illuminated display device that includes a light source directing light generally along a first axis and a reflective image display unit disposed with an optical axis substantially parallel to the first axis. A reflective polarizing film is disposed to direct light from the first light source to the reflective image light display unit. The light source may include a reflector to direct light to the reflective polarizing film.

Another particular embodiment of the invention is an illuminated display device that includes light generating means for emitting diffuse, polarized light along a first direction and reflective display means for modulating reflected light with an image, the reflective display means having an optical axis substantially parallel to the first axis. Reflective polarizing means are disposed to direct the diffuse, polarized light from the light generating means to the reflective display means.

In another embodiment of the invention, an optical system includes a display device that has a first light source directing light generally along a first axis and a reflective image display unit disposed with an optical axis substantially parallel to the first axis. A reflective polarizing film is disposed to direct light from the first light source to the reflective image light display unit. A controller is coupled to the reflective image display unit to control the image formed by the reflective image display unit. Viewing optics transport the image formed by the reflective display unit to a user.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 11A schematically illustrates an embodiment of the present invention used in Example 1;

FIGS. 11B and 11C respectively illustrate schematic side and top views of the embodiment illustrated in FIG. 11A;

Figure 1:
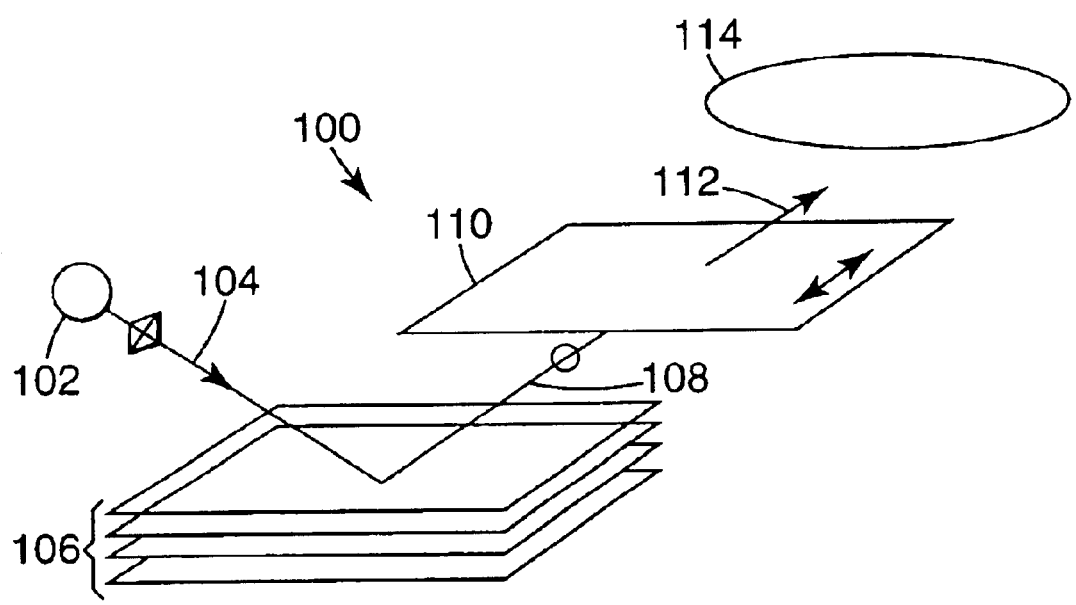
FIG. 1 illustrates schematically illustrates a reflective display system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to reflective displays and is believed to be particularly useful for microdisplays that employ reflective display devices. Amongst the advantages provided by the invention are a reduction in manufacturing costs for a display system and an increased reliability.

Reflective displays are used in several types of information display system. FIG. 1 illustrates basic elements of a reflective display 100. A light source 102 transmits polarized light 104 to a reflective image display unit 106. The reflective image display unit 106 may be a liquid crystal display (LCD) unit, for example a LCD on silicon (LCOS) display. Light 108 reflected by the reflective image display unit 106 is directed to a polarizer 110. Light 112 transmitted through the polarizer 110 is then transmitted through viewing optics 114, which may include one or more lenses, that transmit the image to the viewer. In this arrangement, LCD unit modulates the incident light by rotating the polarization of some of the incident light by 90°. Reflected light 108 whose polarization has been rotated is transmitted by the polarizer 110 to the viewing optics 114. Reflected light whose polarization remains unrotated is not transmitted by the polarizer 110, and is typically absorbed or reflected. The polarizer 110, therefore, separates the image light from non-image light. The viewing optics 114 may be, for example, an eyepiece.

The reflective image display unit 106 may also be a different type of unit, for example an array of individually movable miniature mirrors, such as the Digital Micromirror Devices™ produced by Texas Instruments, or may be based on the use of so-called "electronic paper", such as an electrophoretic display manufactured by E-Tek Inc., or a gyricon-based display manufactured by Xerox Corp. The invention is particularly advantageous for a reflective image display unit that modulates the incident light based on polarization rotation, such as an LCD, but may also be used for other types of reflective image display units.

Figure 2:
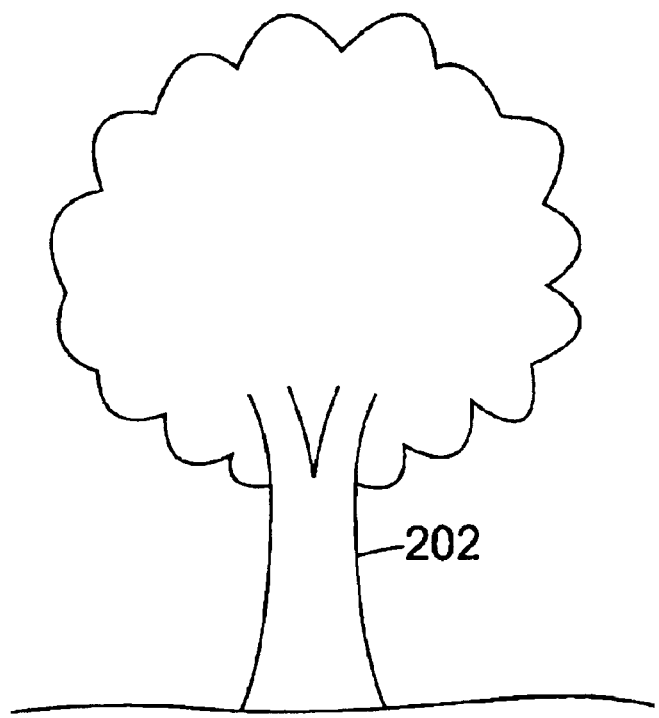
FIG. 2 illustrates a schematic of a camera having an electronic viewfinder.
Figure 2:
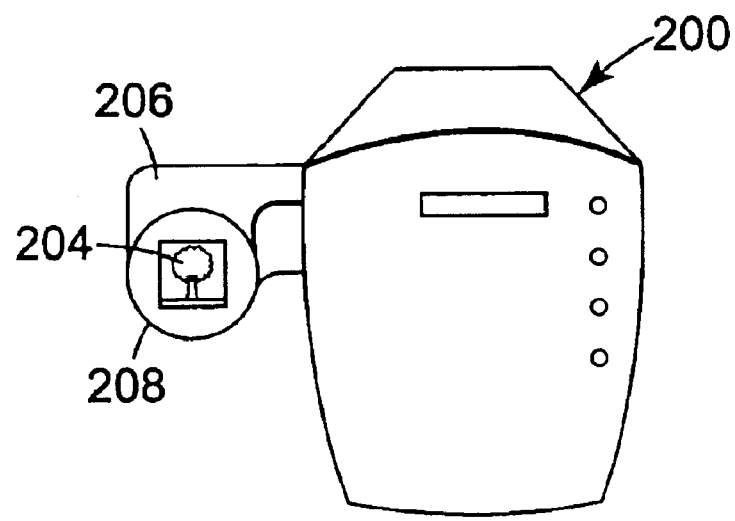

Examples of where a reflective display may be used include microdisplays, for instance, in a viewfinder of an electronic camera. Electronic cameras include video cameras and digital cameras, and any other device that converts an optical image to electronic form. For example, a video camera 200, as illustrated in FIG. 2, records an image of an object 202. The user views an image 204 of the object 202 through a viewfinder 206 by placing his or her eye close to the viewing aperture 208.

Figure 3:
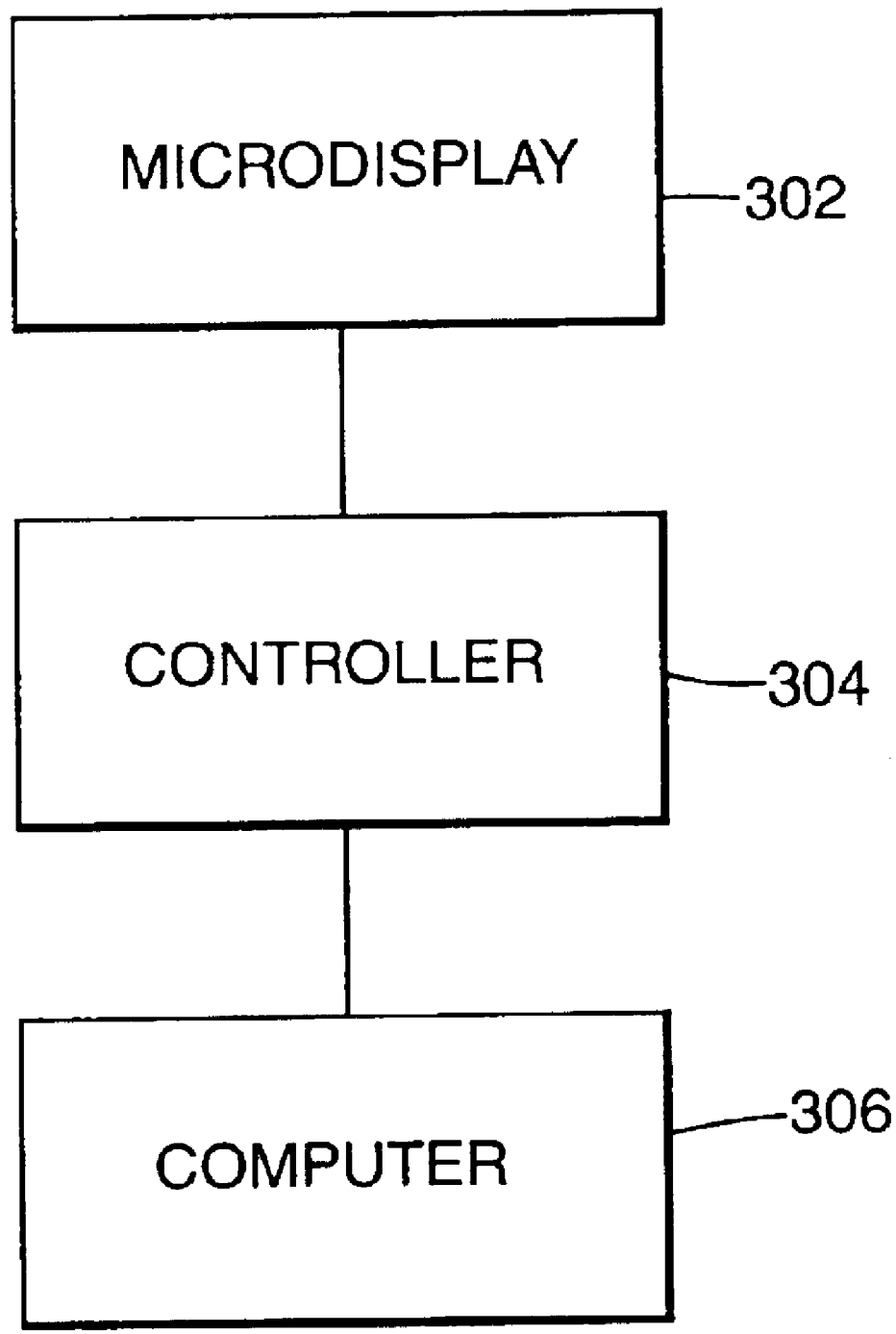
FIG. 3 schematically illustrates a microdisplay connected to a controller and a computer.

Microdisplays may also be used elsewhere, for example in head-mounted displays such as DVD viewers, virtual reality goggles, wearable computer displays and internet appliances. A general approach to using a microdisplay is illustrated in FIG. 3, which shows microdisplay 302, which typically includes a light source, reflective image display unit and viewing optics, coupled to a controller 304. The controller 304 may be, for example, a DVD player which is coupled to direct the image from the DVD player to the microdisplay 302. The controller 304 may also be coupled to, or part of, a computer system 306 to display information from the computer system, for example in a heads-up display, virtual reality goggles or as a display for a wearable computer. The microdisplay 302 may also be used in a wearable display for a laptop or other type of computer.

It will be appreciated that reflective displays are not restricted to use in microdisplays, but may also be used in larger displays, for example projection displays and heads-up displays.

Figure 4:
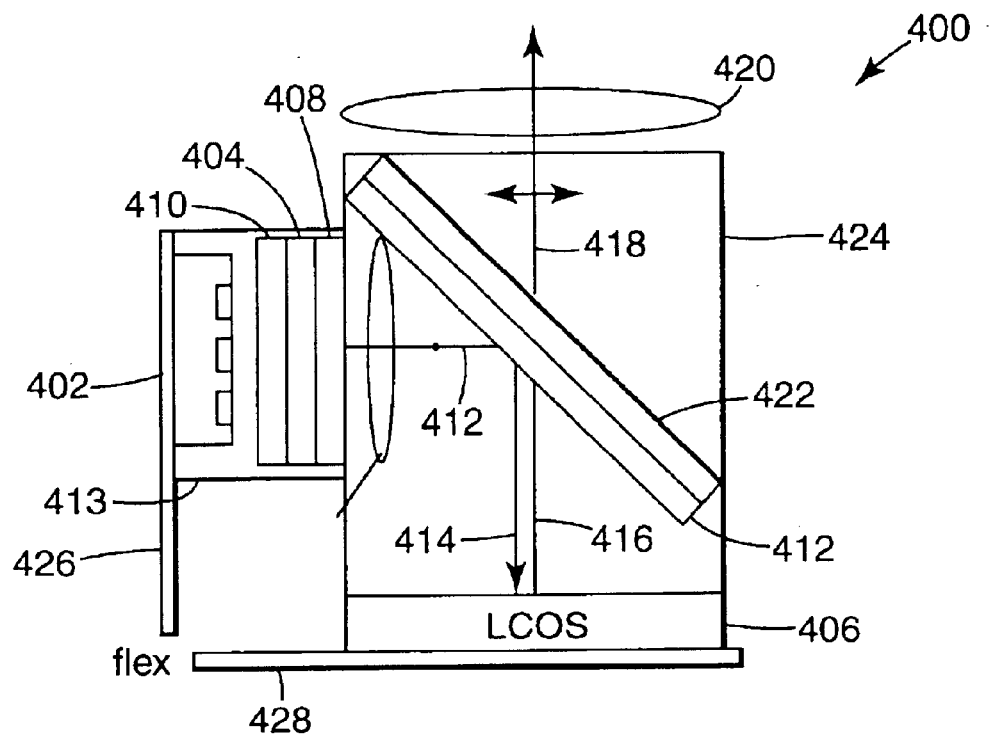
FIG. 4 schematically illustrates an optically folded reflective display system.

One particular arrangement for a reflective display that may be used in a microdisplay is illustrated in FIG. 4. The reflective display 400 includes a three-color light emitting diode (LED) 402 for generating light. Light from the LED 402 is directed to a diffuser 404 that mixes and homogenizes the color of the light that is subsequently incident on the reflective image display unit 406. A pre-polarizer 408 polarizes the light that has passed through the diffuser so that light of only one polarization is incident on the reflective image display unit 406.

A brightness enhancer 410 may be placed before the diffuser 404 to enhance the brightness of the light reaching the reflective image display unit 406. For example, the brightness enhancer 410 may be a film having a prismatic structure on an input surface to direct off-axis light from the LED 402 towards the axis 412, such as BEF brightness enhancing film manufactured by 3M Company of Minnesota. Light reflected by the BEF brightness enhancing film may be recirculated by a diffusely reflecting cavity 413 containing the LED 402.

The brightness enhancer 410 may also be a reflective polarizing film whose transmission polarization state is substantially aligned with the transmission polarization state of the pre-polarizer 408. If a reflective polarizing film is used as the brightness enhancer 410, the LED 402 is advantageously enclosed within a diffusely reflecting cavity 413 so that the polarization of the light reflected by the brightness enhancer 410 may be randomized as it recirculates within the diffusely reflecting cavity. Randomization of the polarization results in a greater fraction of the light generated by the LED 402 being transmitted by the reflective brightness enhancer 410, thus increasing the optical efficiency of the reflective display 400. One example of a reflective polarizing film that may be used as brightness enhancer 410 is DBEF multilayer optical film manufactured by 3M Company of Minnesota.

Light transmitted by the pre-polarizer 408 is polarized in the block polarization state of a polarizing beamsplitter 412, that is the polarization state orthogonal to the transmission polarization state of the polarizing beamsplitter 412. Therefore, the light is reflected by the polarizing beamsplitter 412 towards the reflective image display unit 406. The reflective image display unit 406 spatially modulates the incident light 414 by polarization rotation. The reflected light 416 contains light in both the block and the pass polarizations for the polarizing beamsplitter 412. Only that light in the pass polarization of the polarizing beamsplitter 412, the image light 418, is transmitted to the eyepiece 420. A clean-up polarizer 422 may be placed between the polarizing beamsplitter 412 and the eyepiece 420 to enhance the contrast of the image viewed by the user. The use of the polarizing beamsplitter 412 for reflecting the illumination light from the LED 402 and for separating the image light 418 enables the reflective display 400 to be more compact.

The reflective image display unit 406, the polarizing beamsplitter 412 and the clean-up polarizer 422 are typically disposed within a housing 424.

There are, however, certain disadvantages with the arrangement for the reflective display 400. For example, the light source, including LED 402, the diffuser 404 and the pre-polarizer 408 is typically mounted on a light source board 426 while the reflective image display unit 406 is mounted on a display board 428, and the two boards 426 and 428 are separately attached to the housing 424. Typically the two boards 426 and 426 are electrically coupled using connectors and flex circuits. This can add significant manufacturing and assembly cost to the display system. Furthermore, the system complexity is increased and the flex circuits lower manufacturing yields and long term reliability.

The present invention is directed to a reflective display where the light source and the reflective image display unit are mounted in a coplanar manner. In other words, the light source is mounted so that its light is generally directed along a first axis that is parallel to the optical axis of the reflective image display device. An advantage of this approach is that the light source and the reflective image display unit may be mounted on a shared board, thus reducing assembly costs. This permits the light source and the reflective image display unit to be soldered to a printed circuit board using standard and relatively inexpensive printed circuit fabrication techniques. The light source and reflective image display unit may even be formed on the same substrate, for example by evaporation or sputtering, or other fabrication method, of the appropriate materials to form an organic or inorganic LED, thus further reducing assembly costs. Furthermore, the flex circuits are eliminated, which not only reduces manufacturing costs, but also eliminates low reliability components.

Figure 5:
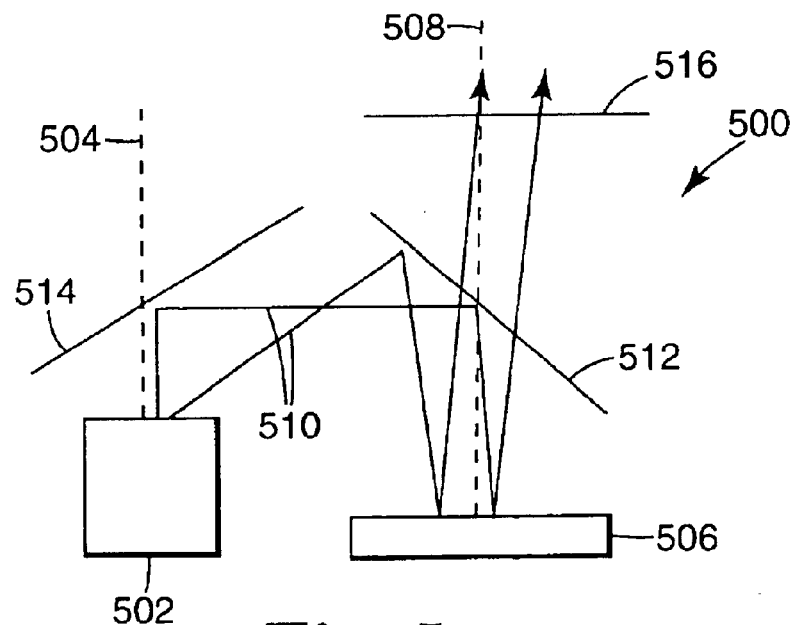
FIG. 5 schematically illustrates an embodiment of a reflective display system of the present invention.

A schematic view of one embodiment of the present invention is illustrated in FIG. 5. The reflective display 500 includes a light source 502 that generally generates light parallel to the first axis 504. It will be appreciated that a light source such as an LED, tungsten bulb or the like, produces light into a large cone angle. However, the direction of maximum intensity, also known as the chief ray, is substantially parallel to the first axis 504.

The reflective image display unit 506 is disposed with its optical axis 508 substantially parallel to the first axis, in other words is mounted coplanar with the light source 502. Light 510 from the light source 502 reflects off at least one reflecting surface, and some light reflects off two reflecting surfaces, before being incident on the reflective image display unit 506. The reflecting surfaces may be provided by a polarizing beamsplitter 512, or a combination of a polarizing beamsplitter 512 and another reflector 514, as is explained more fully below. The reflector 514 may be considered to be part of the light source. A clean-up polarizer 516 may be disposed to enhance the polarization of the light transmitted through the polarizing beamsplitter 512 to increase contrast in the image seen by the viewer. The clean-up polarizer 516 removes, through reflection or absorption, stray light of the polarization normally reflected by the polarizing beamsplitter 512 that may have leaked through the polarizing beamsplitter 512.

Different embodiments of a light source are illustrated in FIGS. 6A–6D. The first embodiment of light source 600, illustrated in FIG. 6A, includes a light emitter 602, which may be a three color LED array, coupled to a diffuser cavity 604. The diffuser cavity 604 may be hollow or filled with a diffusing material, and includes diffusely reflecting side walls. Light output from the cavity 604 may pass through a lens 606 before reaching a diffuser 608. The combination of the diffusing cavity 604 and the diffuser 608 mix and homogenize the light, thus ensuring that the light emerging through the diffuser is uniform in color and brightness. Light that passes through the diffuser 608 is then passed through a pre-polarizer 610.

Figure 6A:
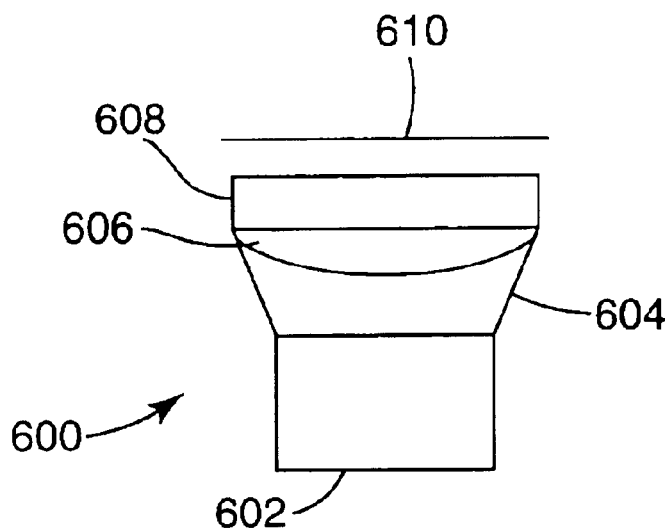
FIGS. 6A–6D schematically illustrate embodiments of light sources according to the present invention.
Figure 6B:
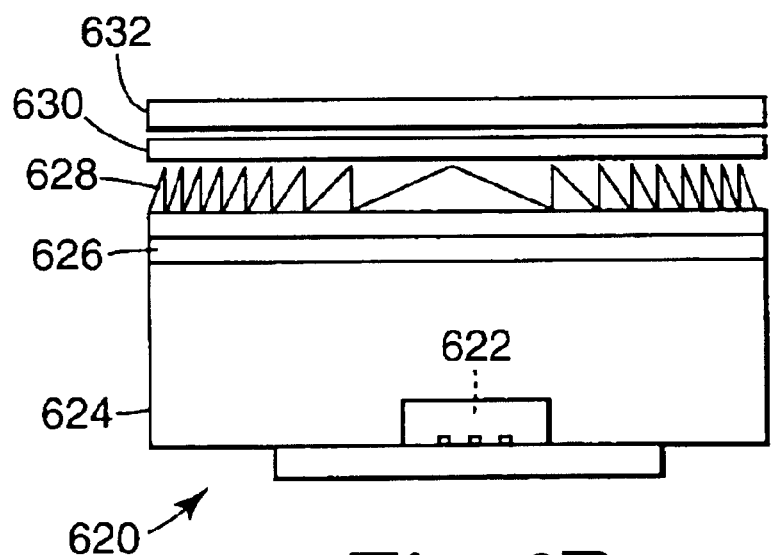

The second embodiment of light source 620, illustrated in FIG. 6B, includes a light emitter 622, such as a three color LED array, coupled to a diffuser cavity 624. The diffuser cavity 624 may be hollow or filled with a diffusing material, and includes diffusely reflecting side walls.

A brightness enhancer 626, for example a prismatic film or reflective polarizing film as described above, may be disposed to intercept light transmitted outwards from the cavity 624. Where the brightness enhancer 626 is a prismatic film, light falling outside a specific angular range is reflected back to the diffuser cavity 624, while light falling within a desired angular range is transmitted. Where the brightness enhancer 626 is a reflective polarizer, light in the block polarization state is reflected to the diffuser cavity 624, while light in the pass polarization state is transmitted. The light returned to the diffusing cavity is recirculated and its direction and/or polarization randomized, so that it may be transmitted through the brightness enhancer on a succeeding pass to the brightness enhancer 626.

A lens 628, such as a curved lens or a Fresnel lens, may be disposed to redirect the light transmitted by the brightness enhancer 626 so as to fall within a narrower cone angle.

The light transmitted out of the cavity 624 illuminates a diffuser 630. The combination of the diffuser 630 and the diffusing cavity 624 is used to make the light emitted from the light source 620 uniformly bright and have uniform color.

Figure 6C:
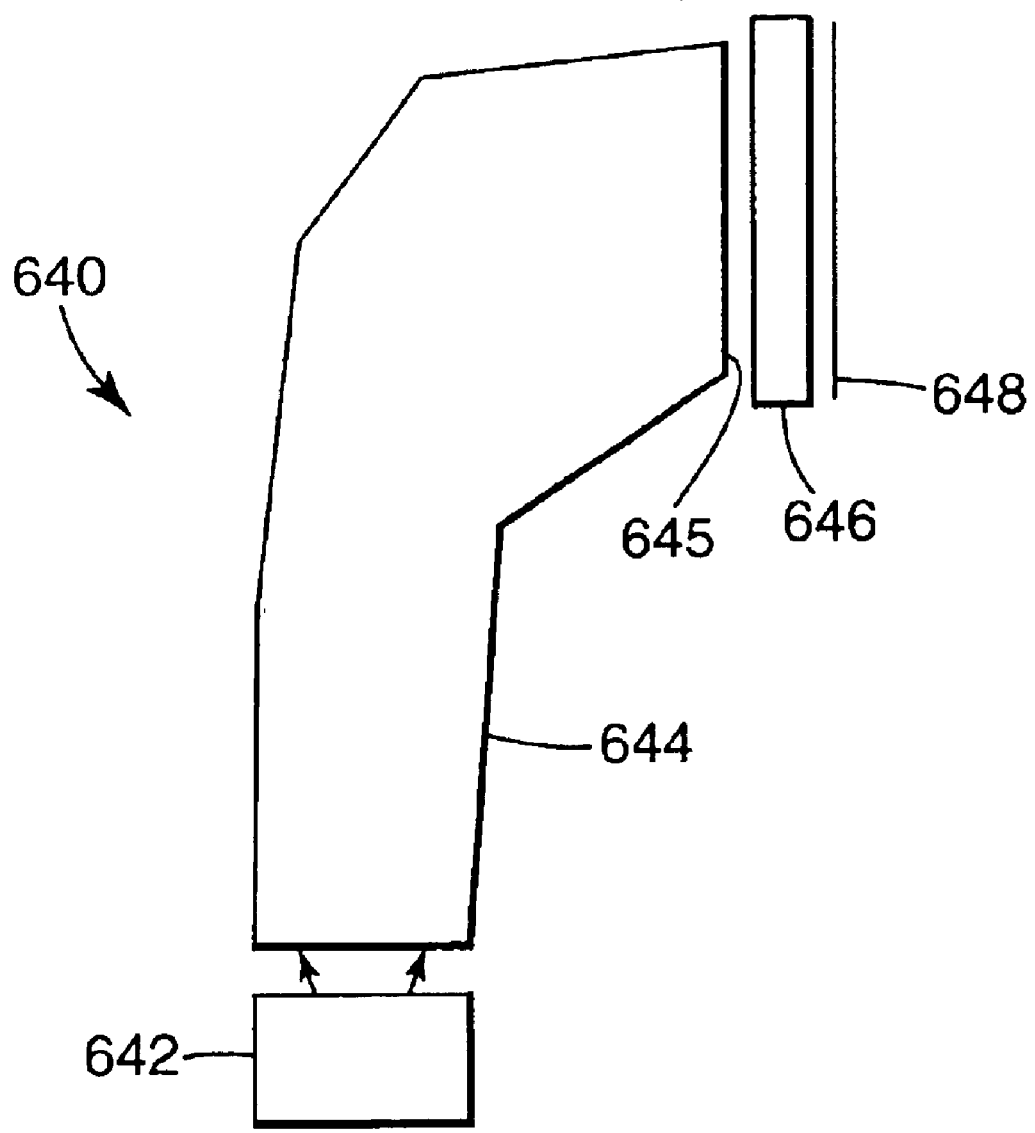

A third embodiment of light source 640, illustrated in FIG. 6C, employs a light emitter 642, which may be a three-color LED array, a diffuser 646 and a pre-polarizer 648. Light from the light emitter 602 is coupled to the diffuser via a light guide 644. The light guide 644 may be, for example, a solid, clear plastic pipe which traps and reflects the light, via total internal reflection at its side walls, or by reflection off side walls coated with a suitably reflective material, to an output window 645. The window 645 may be capped with a diffuser or be roughened, the walls of the light guide 644 may be roughened, or the material within the light guide 644 may itself be diffusing, in order to homogenize the light.

Figure 6D:
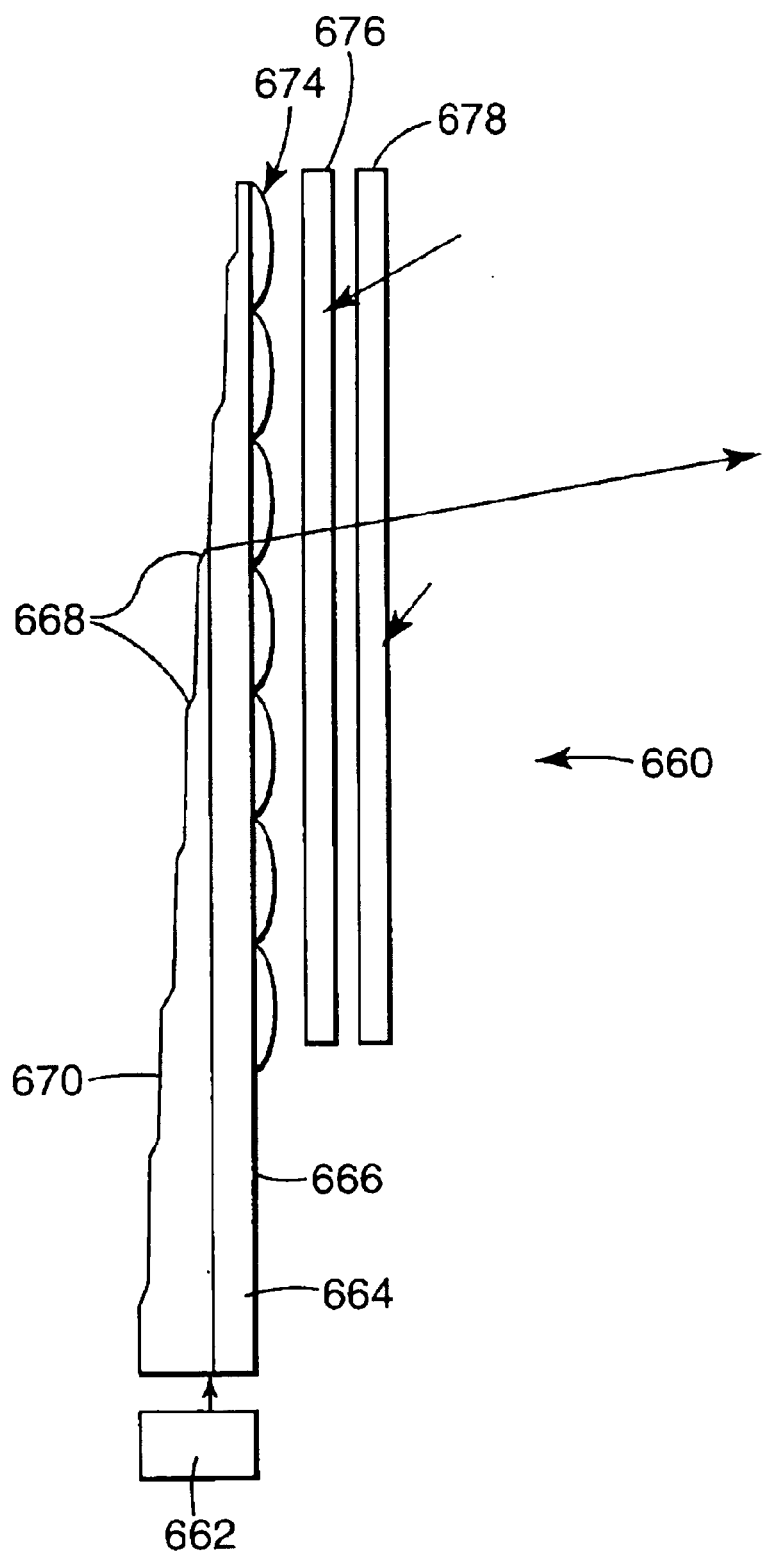

A fourth embodiment of a light source 660, illustrated in FIG. 6D employs a light guide incorporating side extraction for directing the light from a light emitter towards a reflective beamsplitter 512. Light from a light emitter 662, for example a three-color LED unit, enters the light guide 664. The light is extracted through the output face 666 of the light guide 664 by facets or other light scattering features 668 on the disposed on the left hand face 670. The direction and divergence of the light 672 output through the output face 666 may be conditioned by the extraction features 668. For example, the extraction features 668 may be directed at a specific angle or partially collimated. The light 672 exiting the light guide 664 may be further conditioned, for example collimated or partially collimated, by an array 674 of lenslets the output face 666.

Propagation of the light through the light guide 664 may result in mixing and homogenization of the light from the light emitter 662. The light 672 output from the light guide may be further homogenized by a diffuser 676. In addition, light diffusing particles may be embedded within a portion, or all, of the light guide 664 to further mix and homogenize the light.

The light 672 may be polarized by a pre-polarizer 678. The pre-polarizer 678 may be a linear polarizer, for example a dichroic absorber or a reflective polarizer, or may be a circular polarizer, for example a cholesteric polarizer or a dichroic absorber combined with a quarter-wave retarder film.

The lenslet array 674, diffuser 676 and pre-polarizer 678 may be positioned in a region of greatest extraction from the light guide 664 in order to facilitate mixing within the guide for homogenization or to place the outgoing light 672 at an appropriate height for illuminating the polarizing beamsplitter 512.

One of the advantages afforded by this embodiment 660 is its compactness in the direction parallel to the input surface of the reflective image display unit 506.

It will be appreciated that many different types of light source may be used, in addition to variations of the four embodiments illustrated in FIGS. 6A–6D. For example, different types of light emitter may be used, such as incandescent light bulbs, halogen lamps, arc lamps, or any other suitable light emitter. The light emitter may also include a shaped reflector, for example a parabolic reflector, in order to redirect emitted light towards the output of the light source.

The pre-polarizer may be a linear polarizer, for example a polymeric multiple layer reflective polarizing film, as described in U.S. Pat. No. 5,612,820, or a wire grid polarizer, for example as described in WO 94/11766, "A Reflective Polarizer". The pre-polarizer may also be a circular polarizer, for example a cholesteric polarizer as described in U.S. Pat. No. 5,506,704. A cholesteric polarizer is particularly useful where the reflective image display unit is based on the modulation of circularly polarized light.

Likewise, a polarizing brightness enhancer may formed from a multiple layer reflective polarizing film, a wire grid polarizer or a cholesteric polarizer.

Any number of light emitters may be combined in a single light source using this technique, for increased brightness and for covering larger area displays. Furthermore, a reflective display may use more than one light source.

Where light from the light source 502 is reflected off two reflecting surfaces to reach the reflecting image display unit, a reflector 514 may be used for the first reflection and a polarizing beamsplitter 512 used for the second reflection. The reflector 514 may be part of the light source 502.

Figure 7A:
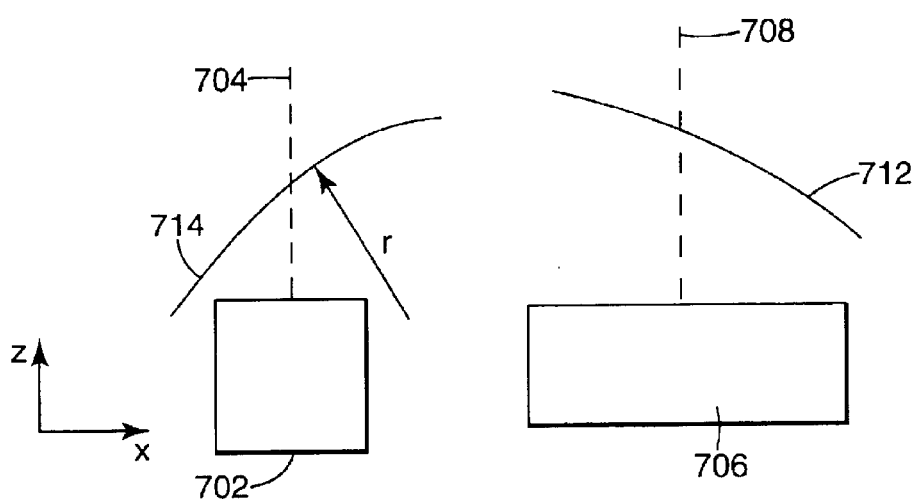
FIGS. 7A and 7B schematically illustrate reflective displays with different embodiments of reflector according to the present invention.

The reflector 514 may be made of a metal-coated substrate (plastic or metal), polished metal, a stamped metal sheet, thermoformed metal coated film, a thermoformed multi-layer optical film, or other suitable reflecting material. Furthermore, the reflector 514 may be flat, as illustrated in FIG. 5, or may be curved in one or two directions to increase illumination uniformity and efficiency. For example, a reflector 714 that is curved in one direction is illustrated in FIG. 7A. The figure illustrates a light source 702 and a reflective image display device 706, mounted in a coplanar fashion. The optical axes 704 and 708 of the light source 702 and reflective image display device 706 are also illustrated. The optical axes 704 and 708 are parallel to the z-direction, and the reflective image display device 706 is translated laterally from the light source 702 in the x-direction. A radius of curvature, r, of the curved reflector 714 lies in the x-z plane.

The divergence of light in the x-z plane, emitted from the light source 702, is reduced upon reflection from the curved reflector 714. The light is directed to the polarizing beamsplitter 712 for transmission to the reflective image display device 706.

Figure 7B:
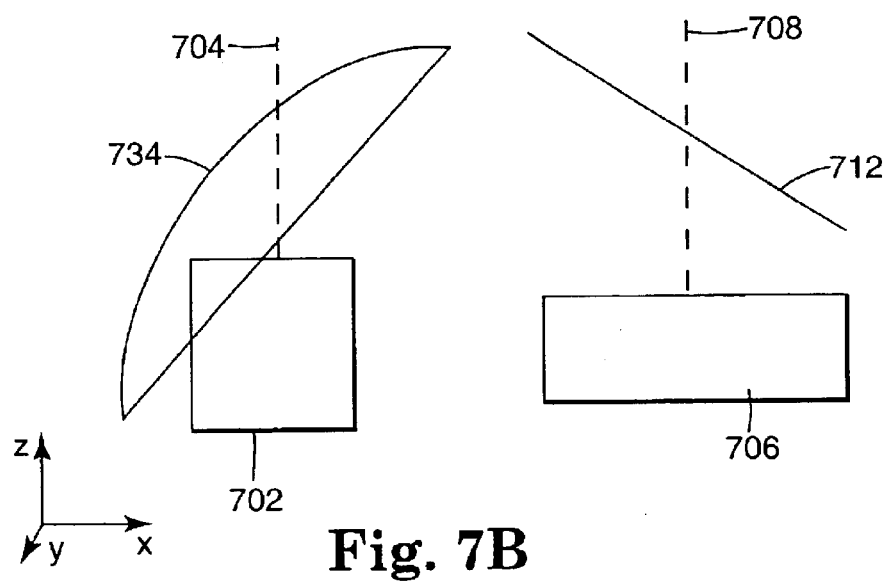

A reflector 734 that is curved in two directions is illustrated in FIG. 7B. In this case, the reflector 734 has a first radius of curvature lying in the x-z plane and a second radius of curvature lying in the y-z plane, where the y-direction is directed out of the plane of the figure, and is orthogonal to both the x and z directions. Light emitted from the light source 702 has it divergence reduced in both the x-z and y-z planes upon reflection from the reflector 734.

It will be appreciated that the reflector may also be singly curved with a radius of curvature in the y-z plane.

The polarizing beamsplitter 512 typically reflects light having one polarization and transmits light having the orthogonal polarization. The polarization may be linear or circular. One particular example of linear polarizer that may be used as the polarizing beamsplitter is a polymeric multiple layer polarizing film, such as DBEF manufactured by 3M Company, Minnesota. This is useful as a polarizing beamsplitter since it maintains a high degree of extinction over a wide spectral and angular range. Furthermore, this type of film may readily be deformed in one or two directions to form curved mirrors to more efficiently collect light from the light source, and to lower the overall profile of the illumination system. Another type of linear polarizer also suitable for use as the polarizing beamsplitter 512 is a wire grid polarizer.

The polarizing beamsplitter 512 may also be a circular polarizer, and may be a cholesteric polarizer. It will be appreciated that use of a cholesteric polarizer may also necessitate the introduction of a quarter wave retarder in order to convert light between linear and circular polarization. For example, where the reflective image display unit 506 operates on linearly polarized light and the light from the light source is also linearly polarized, then the cholesteric polarizer may be provided with a quarter wave retarder layer on its front surface so as to circularize the polarization of the light prior to incidence on the surface of the cholesteric polarizer. Furthermore, the quarter wave retarder linearizes the polarization of the reflected light before propagating to the reflective image display unit 506. Where the light from the light source is circularly polarized, the reflective image display unit 506 may be provided with a quarter wave retarder at its input so as to linearize the polarization of the light reflected from the cholesteric polarizer.

Figure 8A:
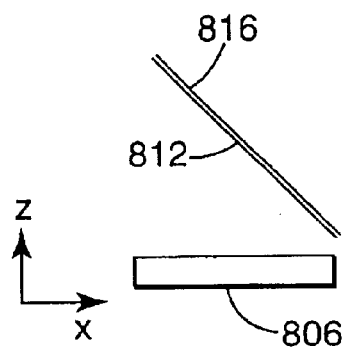
FIGS. 8A–8C schematically illustrate different embodiments of polarizing display according to the present invention.
Figure 8B:
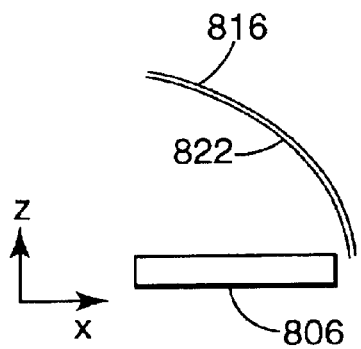
Figure 8C:
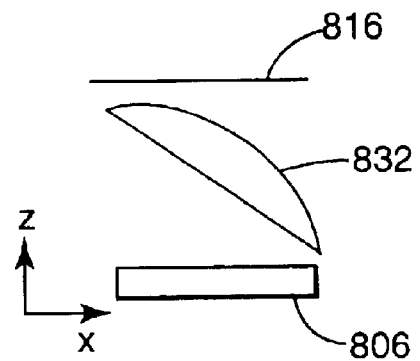

The polarizing beamsplitter 512 may be flat, or curved in one or two directions, as illustrated in FIGS. 8A–8C, which show different types of polarizing beamsplitter positioned close to a reflective image display unit 806. Each polarizing beamsplitter may be provided with a clean-up polarizer 816. The polarizing beamsplitter 812 illustrated in FIG. 8A is flat. The clean-up polarizer may be disposed immediately behind the polarizing beamsplitter 812. The polarizing beamsplitter 822 illustrated in FIG. 8B is curved in one direction. In other words, the polarizing beamsplitter 822 has a radius of curvature lying in the x-z plane, in a manner similar to that described above for the reflector in FIG. 7A.

Advantages of the using polarizing beamsplitter that is flat or is curved in one dimension include the ability to directly laminate the clean-up polarizer 816 to the rear surface of the polarizing beamsplitter 822. Furthermore, simple mechanical devices may be used to provide the shape to the polarizing beamsplitter. For example, the polarizing beamsplitter 822 may be formed from a sheet of material that is constrained at its two opposite ends where the separation between the constraints is less than the overall length of the film so that the film buckles to take on a curved shape. In another example, the polarizing beamsplitter 822 may be formed from a sheet of material that is federal into a curved slot that conforms the sheet to the desired curvature. Both of these advantages reduce manufacturing costs.

A polarizing beamsplitter 832 that is curved in two directions is illustrated in FIG. 8C. This polarizing beamsplitter 832 has a first radius of curvature lying in the x-z plane, and a second radius of curvature lying in the y-z plane. A flat clean-up polarizer 816 may be positioned above the polarizing beamsplitter 832.

The doubly curved polarizing beamsplitter 832 may be shaped by vacu-forming. Furthermore, a laminate of polarizing beamsplitter and clean-up polarizer may be vacuu-formed so that the clean-up polarizer does not need to be mounted separately within the display.

Figure 10:
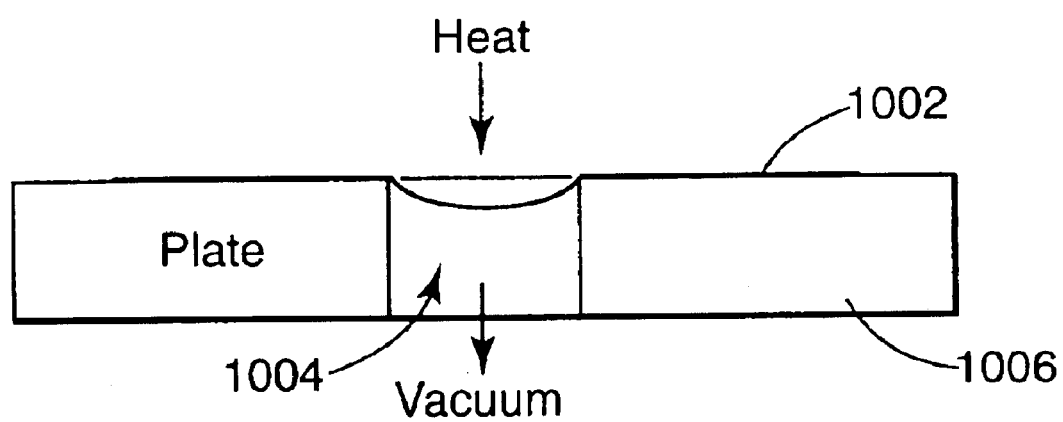
FIG. 10 schematically illustrates a method of vacuforming a doubly curved polarizing beamsplitter.

One particular method of vacu-forming a doubly curved polarizing beamsplitter 832 is illustrated with respect to FIG. 10. A multilayer reflective polarizer optical film 1002 is stretched over a hole 1004 in a plate 1006. A vacuum is applied to pull the film 1002 through the hole 1004. Heat is applied using a heat gun to soften the film 1002 and to deepen the sag, forming a concave surface. When cooled, the film 1002 retains the concave shape. Using this technique for forming a doubly curved polarizing beamsplitter, the polarization extinction is maintained out to the edge of the concave shape. A curved polarizing beamsplitter 832 having an elliptical edge may also be made by vacu-forming through an elliptical hole 1004. The transmission axis of the curved polarizing beamsplitter may be controlled by aligning the optical axes of the film 1002 to the major axis of the hole 1004.

A singly curved polarizing beamsplitter 822 generally shows higher polarization extinction over a wider angular range than the doubly curved polarizing beamsplitter 832 PBS, owing to the higher range of angles of incidence on the doubly curved surface. Thus, it becomes increasingly more important to use a clean-up polarizer 816 with a doubly-curved polarizing beamsplitter 832. A doubly curved beamsplitter assembly may be formed by first laminating the clean-up polarizer 816 to the polarizing beamsplitter 832 to form a lamination, and then vacu-forming the lamination using the vacu-forming technique illustrated in FIG. 10.

It will be appreciated that the polarizing beamsplitter may be singly curved with a radius of curvature in the y-z plane.

Different embodiments of polarizing beamsplitter are presented in the display devices shown in FIGS. 9A–9G. Each display device includes a light source 902 and a reflecting image display device 906. In several of the illustrated embodiments, the reflector 514 and the polarizing beamsplitter 512 are formed from a single, unitary portion of reflective polarizer material, which reduces manufacturing costs.

Figure 9A:
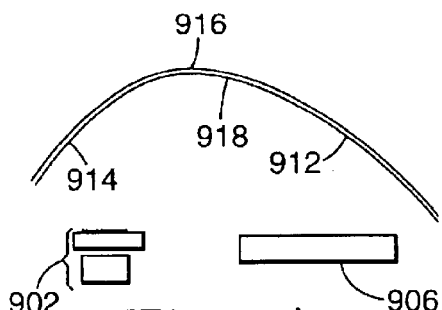
FIGS. 9A–9G schematically illustrate different embodiments of reflective display according to the present invention.

In FIG. 9A, the reflector 914 and polarizing beamsplitter 912 are formed from a single unitary portion of the reflective polarizer material 918. The unitary portion of reflective polarizer material 918 is singly curved, and may have different curvatures for the reflector 914 and the polarizing beamsplitter 912. A clean-up polarizer 916 may be laminated to the rear surface of the unitary portion of reflective polarizer material 918, or may be disposed elsewhere to clean up the polarization of light transmitted through the polarizing beamsplitter 912.

Figure 9B:
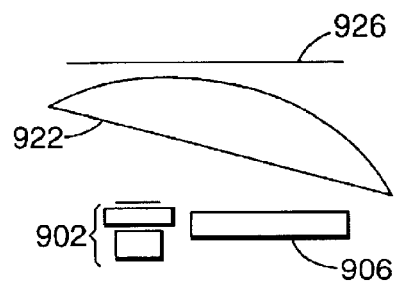

In FIG. 9B, the polarizing beamsplitter 922 extends over both the light source 902 and the reflecting image display unit 906 to collect light directly from the light source 902 and direct it to the reflective image display unit 906. The polarizing beamsplitter 922 may be doubly curved, as illustrated, or may be singly curved. A flat clean-up polarizer 926 may be provided above the polarizing beamsplitter 922, or may be formed onto the rear surface of the polarizing beamsplitter.

Figure 9C:
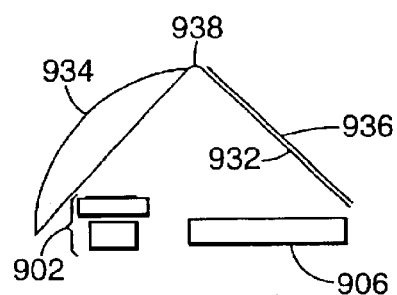

In FIG. 9C, the reflector 934 and polarizing beamsplitter 932 are formed from a single unitary portion of the reflective polarizer material 938. The reflector 934 may be doubly curved, as illustrated, may be singly curved, or may be flat.

The polarizing beamsplitter 932 may be flat, as illustrated, may be singly curved or may be doubly curved. A clean-up polarizer 936 may be disposed to clean-up the polarization of light transmitted through the polarizing beamsplitter 932 from the reflective image display unit 906. The clean-up polarizer 936 may be laminated or otherwise attached to the polarizing beamsplitter 932.

Figure 9D:
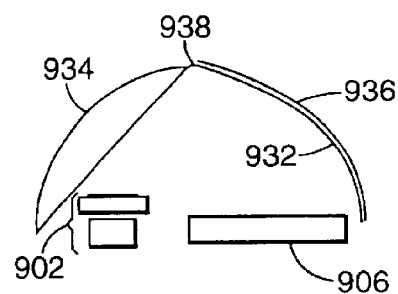
Figure 9E:
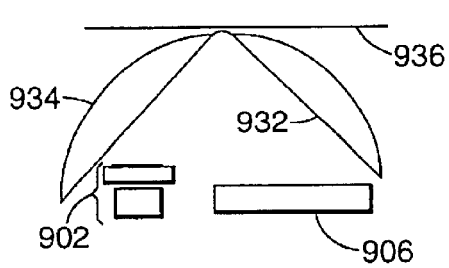

Different variations of the embodiment illustrated in FIG. 9C are shown in FIGS. 9D and 9E. In FIG. 9D, the reflector 934 is doubly curved, and the polarizing beamsplitter 932 is singly curved. In FIG. 9E, both the reflector 934 and the polarizing beamsplitter 932 are doubly curved. It will be appreciated that flat, singly curved and doubly curved reflectors 934 may be combined in different ways with flat, singly curved and doubly curved polarizing beamsplitters 932. Furthermore, the clean-up polarizer 936 may extend over both the reflector 934 and the polarizing beamsplitter 936, for example as illustrated in FIG. 9E.

Figure 9F:
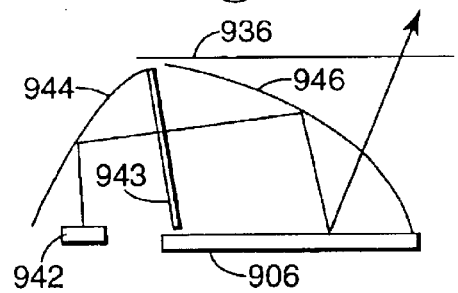

In the embodiment illustrated in FIG. 9F, the light source is distributed. A light emitter directs light to the reflector 944. A diffuser/polarizer 943, including a diffuser and a pre-polarizer, is positioned between the reflector 944 and the polarizing beamsplitter 946 so that light is diffused and polarized by the diffuser/polarizer 943 after reflection by the reflector 944. An advantage of this embodiment is that there may be greater overlap of light beams from multiple emitters prior to diffusion and polarization, resulting in an enhanced illumination uniformity.

Figure 9G:
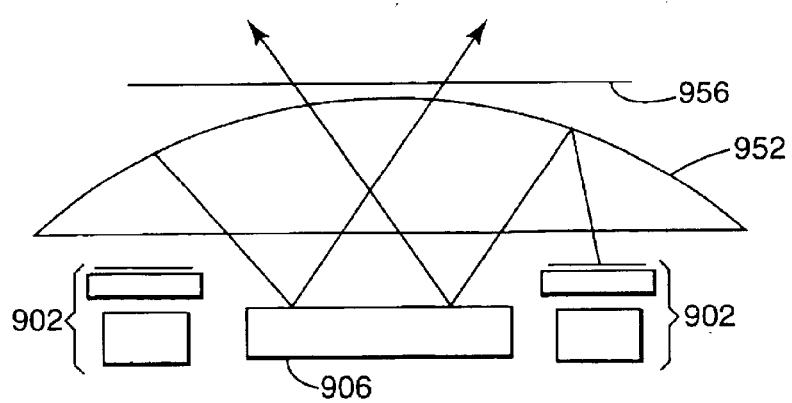

The invention is not limited to single light sources. Multiple light sources may be placed in coplanar positions relative to the reflective image display unit 906 to increase brightness or to improve illumination uniformity of the reflective image display unit 906. One particular embodiment using multiple light sources is illustrated in FIG. 9G. In this particular embodiment, the polarization beamsplitter 952 extends over the two light sources 902 as well as the reflective image display unit 906. Light from the light sources 902 is reflected to the reflective image display unit 906 which modulates and reflects the light back to the reflective polarizer 952. The modulated light is transmitted through the polarizing beamsplitter 952 to the viewer. A clean-up polarizer 956 may be disposed to clean-up the light transmitted through the polarizing beamsplitter.

Different reflector and beamsplitter designs have been explored for effectiveness in illuminating a reflective image display unit. The major characteristics of interest in designing a reflector/beamsplitter combination include the efficiency with which light from the light source is directed onto the surface of the reflective image display unit within the display unit's acceptance cone, and the uniformity of illumination across the reflective image display unit. An additional parameter that was studied was the maximum height of the reflector/beamsplitter combination above the display unit, this last parameter is important in designing display units that are used in confined spaces, for example in a camcorder or other type of camera. In the examples described below, the illumination of a display unit was calculated for a particular configuration of reflector and beamsplitter.

EXAMPLE 1

In the first example, illustrated in FIGS. 11A–11C, the light source 1102 was assumed to include a light emitting diode followed by a diffuser. The light source 1102 was centered at a point approximately 5 units from the center of an LCD display unit 1104. Since the display illumination system scales linearly with size, dimensions are presented in arbitrary "units" rather than in any particular linear measure. The light source 1102 was assumed to have a Lambertian, uniformly emitting surface, having a size 1 unit×1.6 units. The short dimension was aligned parallel to direction of separation between the light source 1102 and the LCD display unit 1104. The LCD display unit 1104 was assumed to be 2.88 units×3.84 units, oriented with its long dimension parallel to the separation direction between the LCD display unit 1104 and the LED 1102. The emitting surface of the LED 1102 was assumed to be 0.98 units higher than the surface of the liquid crystal layer of the LCD display unit 1104.

The polarizing beamsplitter 1112 was assumed to be formed as a flat sheet positioned above the LCD display unit 1104 at an angle of 40° relative to the upper surface 1104a of the display unit 1104.

The reflector 1114 was assumed to have a "tapered box" shape, being formed with an upper reflecting surface 1314a, and side reflecting surfaces 1314b (only one side reflecting surface shown in FIGS. 11A and 11B). The shape of the upper surface 1314a was formed using an AUTOCAD spline function that connected the following points in the (x,z) plane: (5.5804, −0.2035), (5.9644, 0.9476), (5.6674, 1.6398), (5.1616, 2.2553), (4.1499, 3.2774), and (3.0478, 4.5078). The tangent at the first point was set by the point (5.7462, 0.1190) and the tangent to the last point was set by the point (3.5694, 3.9642). The cross-sectional shape formed by the "tapered box" was rectangular, and the aspect ratio of the rectangular cross-section was preserved throughout its length, from the light source 1102 to the output end.

The combination of flat beamsplitter 1112 and "tapered box" reflector 1114 produced the following results. The efficiency of illuminating the LCD display unit 1104 was 4.6%. The efficiency was defined as the ratio of light entering the LCD display unit 1104 within its acceptance cone angle over the total amount of light emitted by the light source 1102. The uniformity of illumination was measured by the ratio of the brightness of the maximum of illumination intensity on the LCD display unit 1104 over the brightness of the minimum illumination intensity on the LCD display unit 1104. In this particular case, the max/min ratio was 3.34. Lastly, the height, H, the maximum beamsplitter height above the LCD display unit 1104 required to enable this particular combination of reflector and beamsplitter to operate most effectively, was 5.57 units.

EXAMPLE 2

Figure 12:
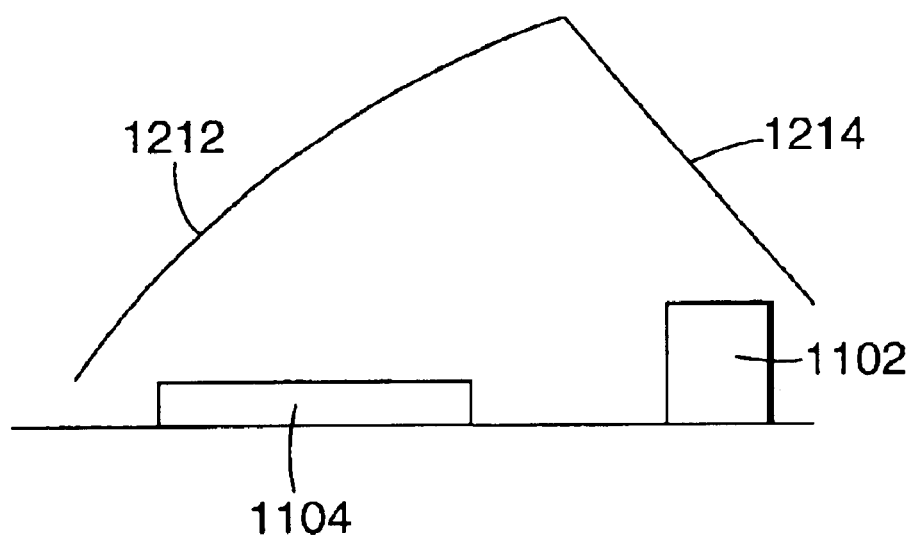
FIG. 12 schematically illustrates the embodiment of the invention used in Example 2.

In the second example, illustrated in FIG. 12, the light source 1102 and LCD display unit 1104 were assumed to have the same size and relative spacing as in Example 1. The only differences between the design of Example 1 and Example 2 were in the shapes of the reflector and the beamsplitter. The beamsplitter 1212 was assumed to have a singly curved shape, forming a 41° arc having a radius of curvature of 11.903 units. The reflector 1214 was assumed to be flat and oriented at 47° to the emitting surface of the light source 1102.

For this particular combination, the illumination efficiency was 3.4%, the max/min ratio was 2.8 and the height, H, was 4.53 nits. The overall illumination efficiency was less than in Example 1 because the flat reflector is not as good at gathering the light from the light source 1102 and presenting it to the beamsplitter for reflection to the LCD display unit 1104. On the other hand, the illumination uniformity is increased through the use of the curved beamsplitter. Also, use of the curved beamsplitter results in a reduction in the overall height, H.

EXAMPLE 3

Figure 13:
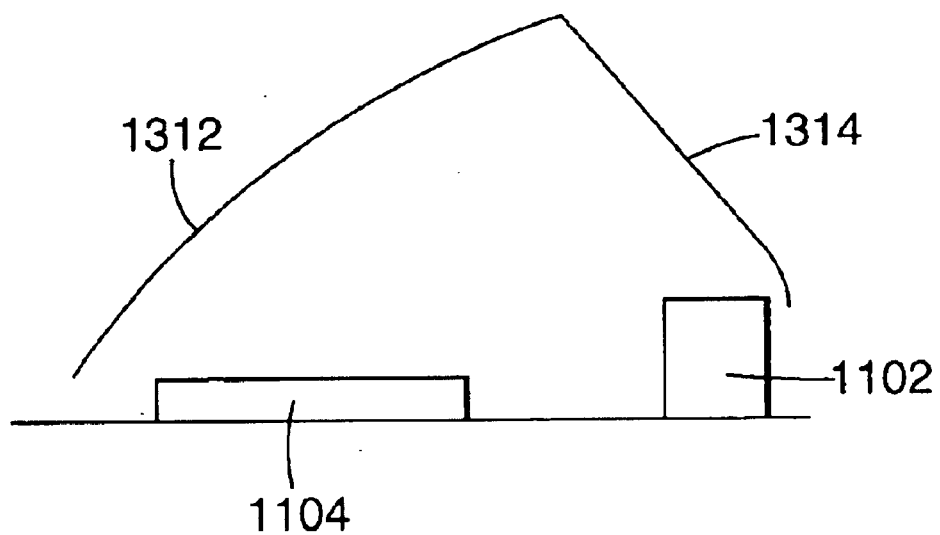
FIG. 13 schematically illustrates the embodiment of the invention used in Example 3.

In the third example, illustrated in FIG. 13, the light source 1102 and LCD display unit 1104 were assumed to have the same size and relative spacing as in Example 1. The only differences between the design of Example 1 and Example 3 were in the shapes of the reflector and the beamsplitter. The beamsplitter 1312 was assumed to have the same shape as in Example 2. The reflector was assumed to be a singly-curved reflecting surface, having a curved profile matching the curved profile of the upper reflector 1114a described for Example 1.

For this particular combination, the illumination efficiency was 4.6%, the max/min ratio was 1.93 and the height, H, was 4.53 units. The human eye is typically able to detect a max/min ration in excess of about 2, so this design approaches the region of acceptable uniformity where the eye does not detect any nonuniformity.

EXAMPLE 4

Figure 14A:
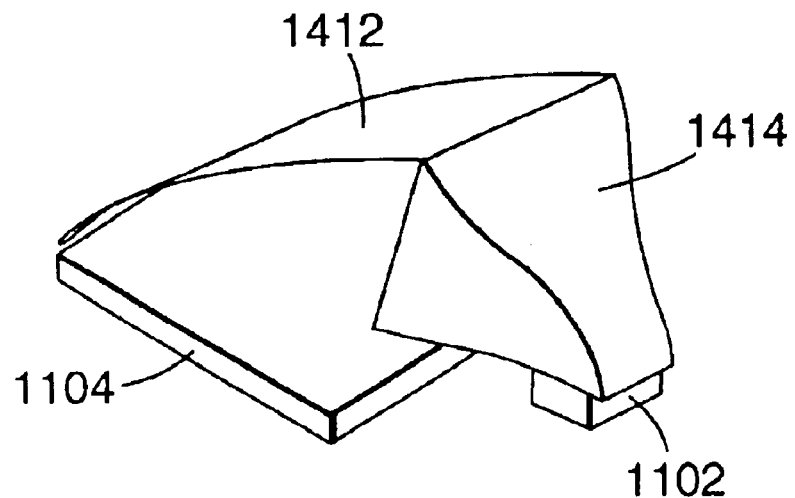
FIG. 14A schematically illustrates an embodiment of the present invention used in Example 4.
Figure 14B:
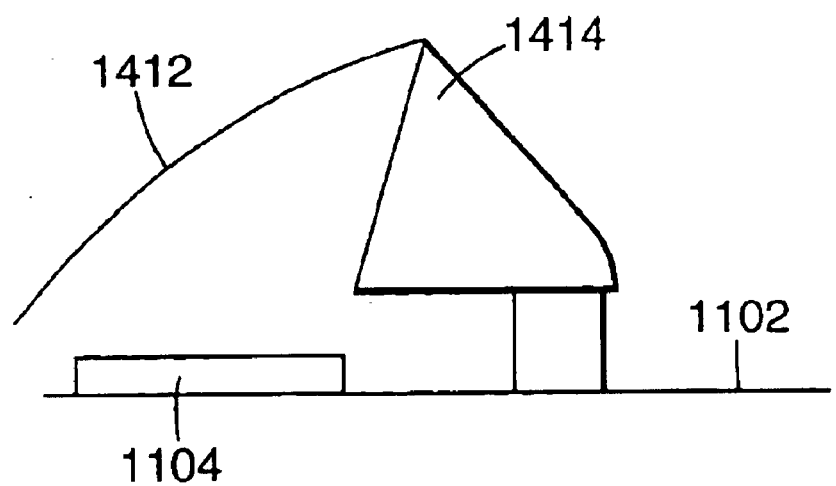
FIG. 14B illustrates a schematic side view of the embodiment illustrated in FIG. 14A.

In the fourth example, illustrated in FIGS. 14A and 14B, the light source 1102 and LCD display unit 1104 were assumed to have the same size and relative spacing as in Example 1. Furthermore, the reflector 1414 was assumed to have the same "tapered box" shape as described for the reflector 1114 in Example 1. The only difference between the design of Example 1 and Example 4 was in the shape of the beamsplitter 1412. The beamsplitter 1412 was assumed to have the same arcuate shape as in Example 2.

For this particular combination, the illumination efficiency was 8.2%, the max/min ratio was 1.25 and the height, H, was 4.53 units.

EXAMPLE 5

Figure 15A:
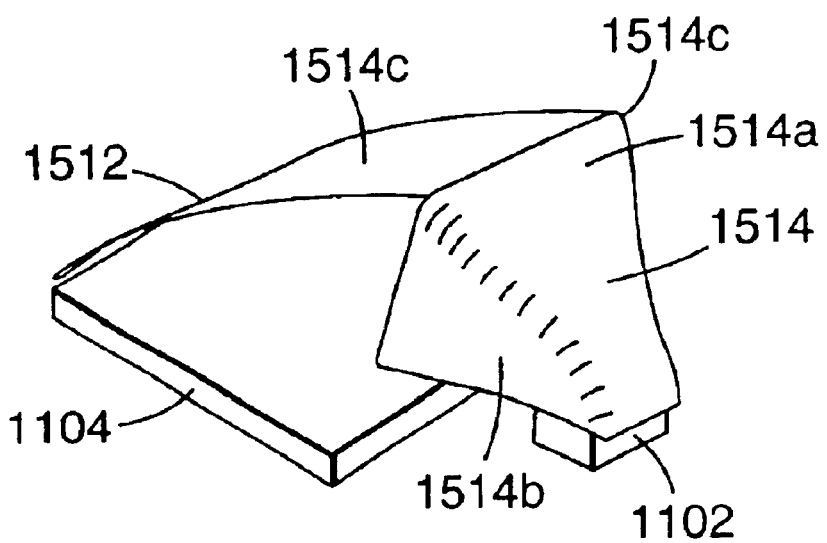
FIG. 15A schematically illustrates an embodiment of the present invention used in Example 5.
Figure 15B:
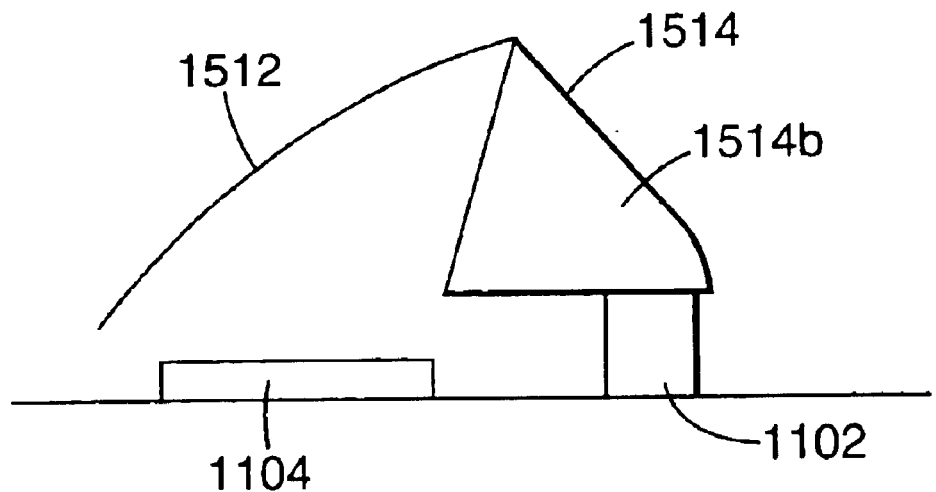
FIG. 15B illustrates a schematic side view of the embodiment illustrated in FIG. 15A.

In the fifth example, illustrated in FIGS. 15A and 15B, the light source 1102 and LCD display unit 1104 were assumed to have the same size and relative spacing as in Example 1. Furthermore, the beamsplitter 1512 was assumed to be the same as in Example 4. The reflector 1514 was assumed to have the same general "tapered box" shape as in Example 4. However, rather than having the upper surface 1514a meet the side surfaces 1514b at right angles, the corners 1514c between the upper surface 1514a and sides 1514b were curved. For this particular combination, the illumination efficiency was 6.7%, the max/min ratio was 1.52 and the height, H, was 4.53 units. The results for the five examples are summarized in Table I.

TABLE I

Summary of Illumination Characteristics for Different Reflector/Beamsplitter Combinations

|  | Reflector | Beamsplitter | Max/Min | Eff. | H (arb. units) |
|---|---|---|---|---|---|
| Ex. 1 | tapered box square corners | flat | 3.34 | 4.6% | 5.57 |
| Ex. 2 | flat | single curve arcuate | 2.80 | 3.4% | 4.53 |
| Ex. 3 | single curve spline | single curve arcuate | 1.93 | 4.6% | 4.53 |
| Ex. 4 | tapered box square corners | single curve arcuate | 1.25 | 8.2% | 4.53 |
| Ex. 5 | tapered box rounded corners | single curve arcuate | 1.52 | 6.7% | 4.53 |

While various examples were provided above, the present invention is not limited to the specifics of the illustrated embodiments. As noted above, the present invention is believed to be particularly applicable to illumination sources requiring a uniform, or substantially uniform, light output. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An illuminated display device, comprising:
    a first light source mounted to a first position on a substantially planar mount surface of a mount and directing light generally along a first axis;

a reflective image display unit mounted to a second position on the mount surface different from the first position, with an optical axis substantially parallel to the first axis; and a reflective polarizing film disposed to direct light from the first light source to the reflective image display unit.

2. A device as recited in claim 1, wherein the reflective polarizing film is curved in at least one dimension.

3. A device as recited in claim 2, wherein the optical axis of the reflective image display unit is laterally displaced from the first axis in a displacement direction and the reflective polarizing film is curved with a radius of curvature lying parallel to a plane formed by the first axis and the displacement direction.

4. A device as recited in claim 2, wherein the optical axis of the reflective image display unit is laterally displaced from the first axis in a displacement direction and the reflective polarizing film is curved with a radius of curvature lying parallel to a plane formed by the first axis and an axis orthogonal to both the first axis and the displacement direction.

5. A device as recited in claim 2, wherein the optical axis of the reflective image display unit is laterally displaced from the first axis in a displacement direction and the reflective polarizing film is curved with a first radius of curvature lying parallel to a plane formed by the first axis and the displacement direction and is curved with a second radius of curvature lying parallel to a plane formed by the first axis and an axis orthogonal to both the first axis and the displacement direction.

6. A device as recited in claim 2, wherein a first portion of the reflective polarizing film is displaced from the light source along the first axis and a second portion of the reflective polarizing film is displaced from the reflective image display unit along the optical axis.

7. A device as recited in claim 6, wherein the first portion of the reflective polarizing film is curved.

8. A device as recited in claim 6, wherein the second portion of the reflective polarizing film is curved.

9. A device as recited in claim 6, wherein both the first and second portions of the reflective polarizing film are curved.

10. A device as recited in claim 1, wherein the display system further includes a viewing port for a user to view an image formed by the reflective image display unit, and the reflective polarizing film is disposed between the reflective image display unit and the viewing port.

11. A device as recited in claim 1, further comprising a clean up polarizer disposed to polarize light transmitted through the reflective polarizer from the reflective image display unit.

12. A device as recited in claim 1, further comprising a reflector disposed to direct light from the first light source to the reflective polarizing film.

13. A device as recited in claim 12, wherein at least one of the reflector and the reflective polarizing film is curved in at least one dimension to form a curved reflector.

14. A device as recited in claim 13, wherein the optical axis of the reflective image display unit is laterally displaced from the first axis in a displacement direction and the reflective polarizing film is curved with a radius of curvature lying parallel to a plane formed by the first axis and the displacement direction.

15. A device as recited in claim 13, wherein the optical axis of the reflective image display unit is laterally displaced from the first axis in a displacement direction and the reflective polarizing film is curved with a radius of curvature lying parallel to a plane formed by the first axis and the displacement direction and is curved with another radius of curvature lying parallel to a plane formed by the first axis and an axis orthogonal to both the first axis and the displacement direction.

16. A device as recited in claim 13, wherein the optical axis of the reflective image display unit is laterally displaced from the first axis in a displacement direction and the reflective polarizing film is curved with a radius of curvature lying parallel to a plane formed by the first axis and the displacement direction and is curved with another radius of curvature lying parallel to a plane formed by the first axis and an axis orthogonal to both the first axis and the displacement direction.

17. A device as recited in claim 1, wherein the first light source includes a light emitter to emit light, a diffuser to diffuse the light emitted by the light emitter and a pre-polarizer to polarize light diffused by the diffuser, the light polarized by the pre-polarizer being directed to the reflective image display unit.

18. A device as recited in claim 17, wherein the first light source further includes a reflector disposed to direct light from the light emitter to the reflective polarizing film.

19. A device as recited in claim 17, wherein the light emitted by the light emitter is directed to the reflective image display unit by at least two reflecting surfaces, the reflective polarizing film forming a final reflecting surface closest to the reflective image display unit along an optical path between the light emitter to the reflective image display unit.

20. A device as recited in claim 19, wherein the pre-polarizer is disposed along the optical path between the final reflecting surface and a previous reflecting surface.

21. A device as recited in claim 20, wherein the diffuser is disposed along the optical path between the pre-polarizer and the previous reflecting surface.

22. A device as recited in claim 19, further comprising a light guide disposed between the light emitter and the pre-polarizer, the light guide having an output end to transmit light out of the light guide to the pre-polarizer.

23. A device as recited in claim 22, wherein the diffuser includes the light guide.

24. A device as recited in claim 19, further comprising a light guide coupled to receive light from the light emitter, the light guide having a rear surface and an output surface, the rear surface being provided with light extraction features to direct light propagating within the light guide out through output surface towards the pre-polarizer.

25. A device as recited in claim 24, wherein the diffuser includes the light guide.

26. A device as recited in claim 17, wherein the light emitter includes a set of light emitting diodes, the set emitting light at at least three different wavelengths.

27. A device as recited in claim 1, further comprising a second light source disposed to direct light to the reflective image display unit by reflection off the reflective polarizing film.

28. A device as recited in claim 1, wherein the first light source and the reflective image display are disposed on the mount surface in a coplanar manner.

29. A device as recited in claim 1, wherein the mount is a substrate common to the first light source and the reflective image display.

30. A device as recited in claim 1, wherein the first light source and reflective image display are mounted side by side on the mount surface.

31. A device as recited in claim 1, wherein the mount is a circuit board and the mount surface is a surface of the circuit board.

32. A device as recited in claim 1, wherein at least one of the first light source and the reflective image display unit is mounted directly to the mount surface.

* * * * *

UNITED STATES PATENT AND TRADEMARK OFFICE
CERTIFICATE OF CORRECTION

PATENT NO. : 6,785,049 B1
DATED : August 31, 2004
INVENTOR(S) : Boyd, Gary T.

It is certified that error appears in the above-identified patent and that said Letters Patent is hereby corrected as shown below:

Column 3,
Line 33, delete the word "Devices™" and insert in place thereof -- Device™ --

Column 4,
Line 49, delete the word "beamsplitter412" and insert in place thereof
-- beamsplitter 412 --

Column 10,
Line 41, delete the "," following the word "unit" and insert in place thereof -- . --

Column 11,
Line 44, delete "4.53 nits" and insert in place thereof -- 4.53 units --

Column 12,
Line 25, delete the word "comers" and insert in place thereof -- corners --

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,785,049 B1
DATED : August 31, 2004
INVENTOR(S) : Boyd, Gary T.

It is certified that error appears in the above-identified patent and that said Letters Patent is hereby corrected as shown below:

Drawings,
Sheet 10, Fig. 9E, (second occurrence), please delete "Fig. 9E" and insert therefore -- Fig. 9F --.

Signed and Sealed this

Twelfth Day of July, 2005

JON W. DUDAS
*Director of the United States Patent and Trademark Office*